United States Patent [19]
Fujii et al.

[11] Patent Number: 5,699,205
[45] Date of Patent: Dec. 16, 1997

[54] TAPE LOADING APPARATUS

[75] Inventors: Hitoshi Fujii; Takayuki Hayashi, both of Hirakata; Yusuke Nagae, Takatuki, all of Japan

[73] Assignee: Matsushita Electric Industrial Co., Ltd.

[21] Appl. No.: 703,680

[22] Filed: Aug. 28, 1996

Related U.S. Application Data

[62] Division of Ser. No. 265,121, Jun. 24, 1994, abandoned.

[30] Foreign Application Priority Data

Jun. 25, 1993 [JP] Japan .................................. 5-154769
Jul. 26, 1993 [JP] Japan .................................. 5-183713

[51] Int. Cl.$^6$ .................................................. G11B 15/665
[52] U.S. Cl. ............................................. 360/71; 360/85
[58] Field of Search .................................... 360/85, 71

[56] References Cited

U.S. PATENT DOCUMENTS 5,043,832  8/1991  Ueda et al. .......................... 360/85

FOREIGN PATENT DOCUMENTS 63-224063  9/1988  Japan .
1-300460  12/1989  Japan .
3-259449  11/1991  Japan .

*Primary Examiner*—Robert S. Tupper
*Attorney, Agent, or Firm*—Wenderoth, Lind & Ponack

[57] ABSTRACT

A tape loading apparatus includes a tape drawing member, a drive mechanism, a control circuit for controlling the drive mechanism, and a tape type judging circuit. The control circuit selectively controls a moving speed of the tape drawing member or a changing timing of the moving speed so as to be different in a loading mode and an unloading mode. Alternatively, the control circuit selectively controls the moving speed of the tape drawing member, its posture and/or tape tension depending on the type of tape.

2 Claims, 8 Drawing Sheets

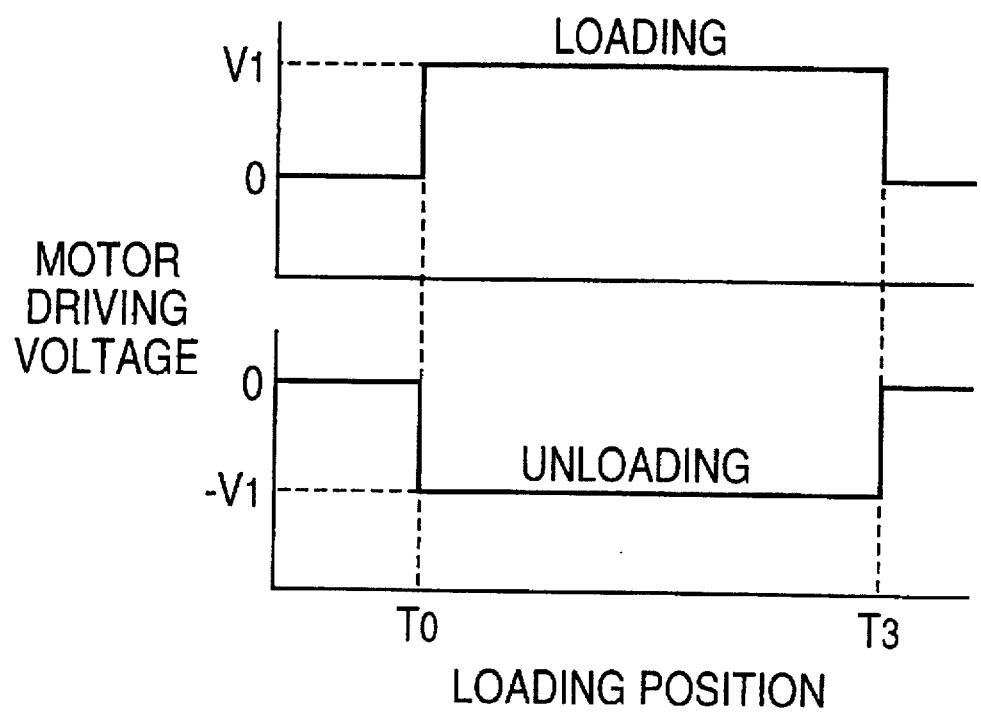
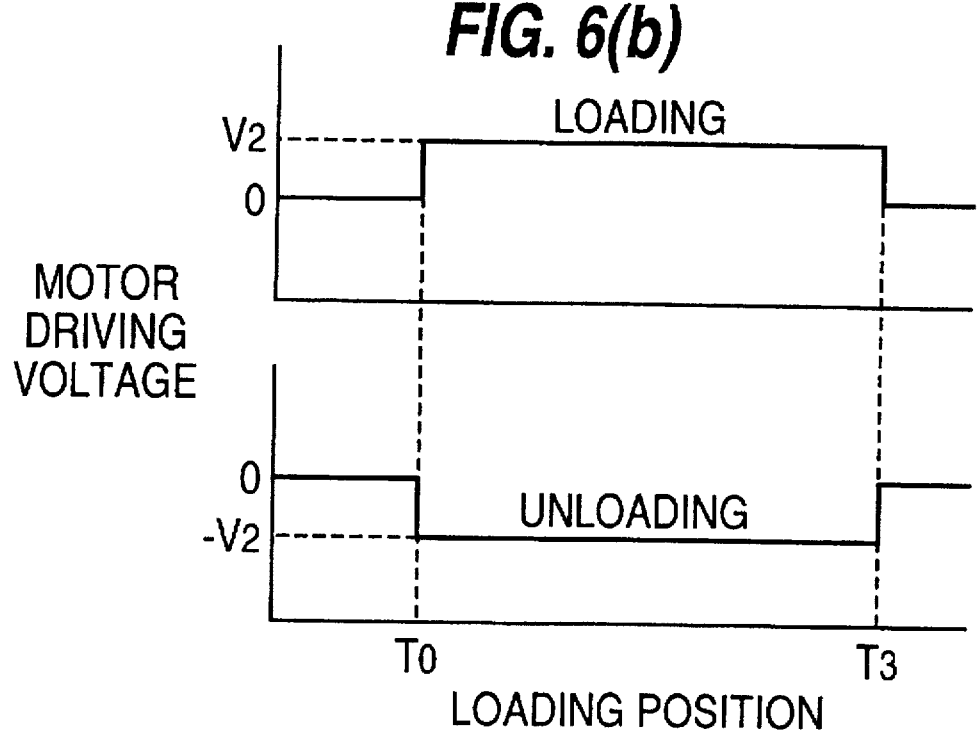

TAPE LOADING APPARATUS

This is a Divisional of now-abandoned application Ser. No. 08/265,121 filed Jun. 24, 1994.

BACKGROUND OF THE INVENTION

1. Field of the Invention

The present invention relates to a magnetic recording and reproducing apparatus such as video tape recorder (VTR), and more particularly to a tape loading apparatus.

2. Description of the Prior Art

In a helical scanning type magnetic recording and reproducing apparatus, a tape drawing member winds a tape obliquely on the outer circumference of a cylinder. This apparatus includes a mechanism for drawing out the tape from a cassette (loading) to a loaded position where the tape is wound on the head cylinder to be ready to run for recording or reproduction, and putting back the tape into the tape cassette (unloading). That is, by the operation of this mechanism, the tape running system is formed, and the tape is made ready to run. In this state, height deviation or distortion does not occur in the tape. In the midst of loading or unloading, however, the specified tape running system is not formed, and height deviation or distortion occurs in the tape. In other words, tape damage occurs in the tape guide member.

Accordingly, a proposal is disclosed in Japanese Patent Publication No. 04-025622, in which it is intended to keep almost constant the moving speed of the tape drawing post. More specifically, a loading motor which is means for driving the tape drawing post is applied with a same voltage in both loading and unloading. Hence, tape sag is eliminated to prevent tape damage. Another proposal is disclosed in Japanese Laid-open Patent No. 63-224063. Herein, a loading position (timing) of the tape drawing post is set in the midst of loading. At the set timing, the moving speed of the tape drawing post is changed. In loading and unloading, the moving speed is changed over at the same timing.

At the time of loading, however, while the tape is being drawn out, a tension is applied to the tape in the opposite direction of the moving direction of the tape drawing post. On the other hand, at the time of unloading, a tension is applied to the tape in the same direction as the moving direction of the tape drawing post. Thus, between loading and unloading, the contact state of the tape drawing post with the tape differs. That is, the tape damage timing is different.

In the prior arts, therefore, since the moving speed of the drawing post, and the timing for changing the moving speed are the same in loading and unloading, it is difficult to eliminate tape damage simultaneously in loading and unloading.

To solve these problems, Japanese Laid-open Patent No. 3-259449 includes a proposal to vary the posture of the tape drawing member between loading and unloading.

Recently, along with the increase in the quantity of information to be recorded, tape consumption tends to increase. As a countermeasure, high density recording and thin tape techniques are being developed. At present, thin tapes are widely used for long time recording.

Hitherto, when both standard thickness tapes and thin tapes are used, the loading and unloading actions are the same. In the prior arts, therefore, it is difficult to eliminate tape damage in both loading and unloading of both tapes.

SUMMARY OF THE INVENTION

It is hence a first object of the invention to solve the above problems by presenting a tape loading apparatus free from tape damage in both loading and unloading.

It is a second object of the invention to solve the above problems by presenting a tape loading apparatus free from tape damage in both loading and unloading even if any of a standard thickness tape and a thinner tape than the standard tape is used.

To achieve these objects, in a first aspect of the invention, a tape loading apparatus comprises a cylinder having mounted thereon a head, a tape guide for drawing out a tape from a tape cassette and winding the drawn-out tape on the cylinder, a tape drawing member for supporting the tape guide and movable reciprocally, driving means for driving the tape drawing member, and control means for controlling the driving means to control a moving speed of the tape drawing member such that the moving speed of the tape drawing member is different between a loading mode and an unloading mode. Here, the loading mode is a mode for loading the tape from the tape cassette to a predetermined position where the tape is wound on the cylinder and movable for signal recording or reproduction, and the unloading mode is a mode for unloading the tape into the tape cassette. As a result, as a measure against tape damage in tape loading and unloading, an appropriate moving speed of the tape drawing member is obtained individually, so that tape damage can be eliminated.

In a second aspect of the invention, a tape loading apparatus comprises a cylinder having mounted thereon a head, a tape guide for drawing out a tape from a tape cassette and winding the drawn-out tape on the cylinder, a tape drawing member for supporting the tape guide and movable reciprocally, driving means for driving the tape drawing member, and control means for controlling the driving means to control a moving speed of the tape drawing member, wherein the control means controls the moving speed of the tape drawing member so as to change in the midst of at least one of the loading and unloading modes, and the control means also controls a moving speed changing timing of the tape drawing member so as to be different between the loading mode and the unloading mode. As a result, as a measure against tape damage in loading and unloading, an appropriate changing timing of moving speed of the tape drawing member is obtained individually, so that tape damage can be eliminated.

In a third aspect of the invention, a tape loading apparatus comprises a cylinder having mounted thereon a head, a tape guide for drawing out a tape from a tape cassette and winding the drawn-out tape on the cylinder, a tape drawing member for supporting the tape guide and movable reciprocally, driving means for driving the tape drawing member, speed control means for controlling the driving means to control a moving speed of the tape drawing member, and judging means for judging a type of the tape, wherein the speed control means controls the driving means to change the moving speed of the tape drawing member depending on the type of the tape judged by the judging means. As a result, as a measure against tape damage in loading and unloading, an appropriate moving speed of the tape drawing member is obtained individually depending on the type of the tape, so that tape damage can be eliminated.

In a fourth aspect of the invention, a tape loading apparatus comprises a cylinder having mounted thereon a head, a tape guide for drawing out a tape from a tape cassette and winding the drawn-out tape on the cylinder, a tape drawing member for supporting the tape guide and movable reciprocally, a guide member for guiding the tape drawing member, driving means for driving the tape drawing member, and judging means for judging a type of the tape, wherein the guide member guides the tape drawing member in different postures depending on the type of the tape judged by the judging means. As a result, as a measure against tape damage in loading and unloading, an appropriate posture of the tape drawing member is obtained individually depending on the type of the tape, so that tape damage can be eliminated.

In a fifth aspect of the invention, a tape loading apparatus comprises a cylinder having mounted thereon a head, a tape guide for drawing out a tape from a tape cassette and winding the drawn-out tape on the cylinder, a tape drawing member for supporting the tape guide and movable reciprocally, driving means for driving the tape drawing member, tension detecting means for detecting a tape tension in the midst of at least one of the loading and unloading modes, tension control means for controlling the tape tension, and judging means for judging a type of the tape, wherein the tension control means varies the tape tension depending on the type of the tape judged by the judging means. As a result, as a measure against tape damage in loading and unloading, an appropriate tape tension of the tape drawing member is obtained individually depending on the type of the tape, so that tape damage can be eliminated.

BRIEF DESCRIPTION OF THE DRAWINGS

FIGS. 6(a) and 6(b) are conceptual drawings for explaining the operation of an embodiment of the invention.

DESCRIPTION OF THE PREFERRED EMBODIMENTS

Figure 1:
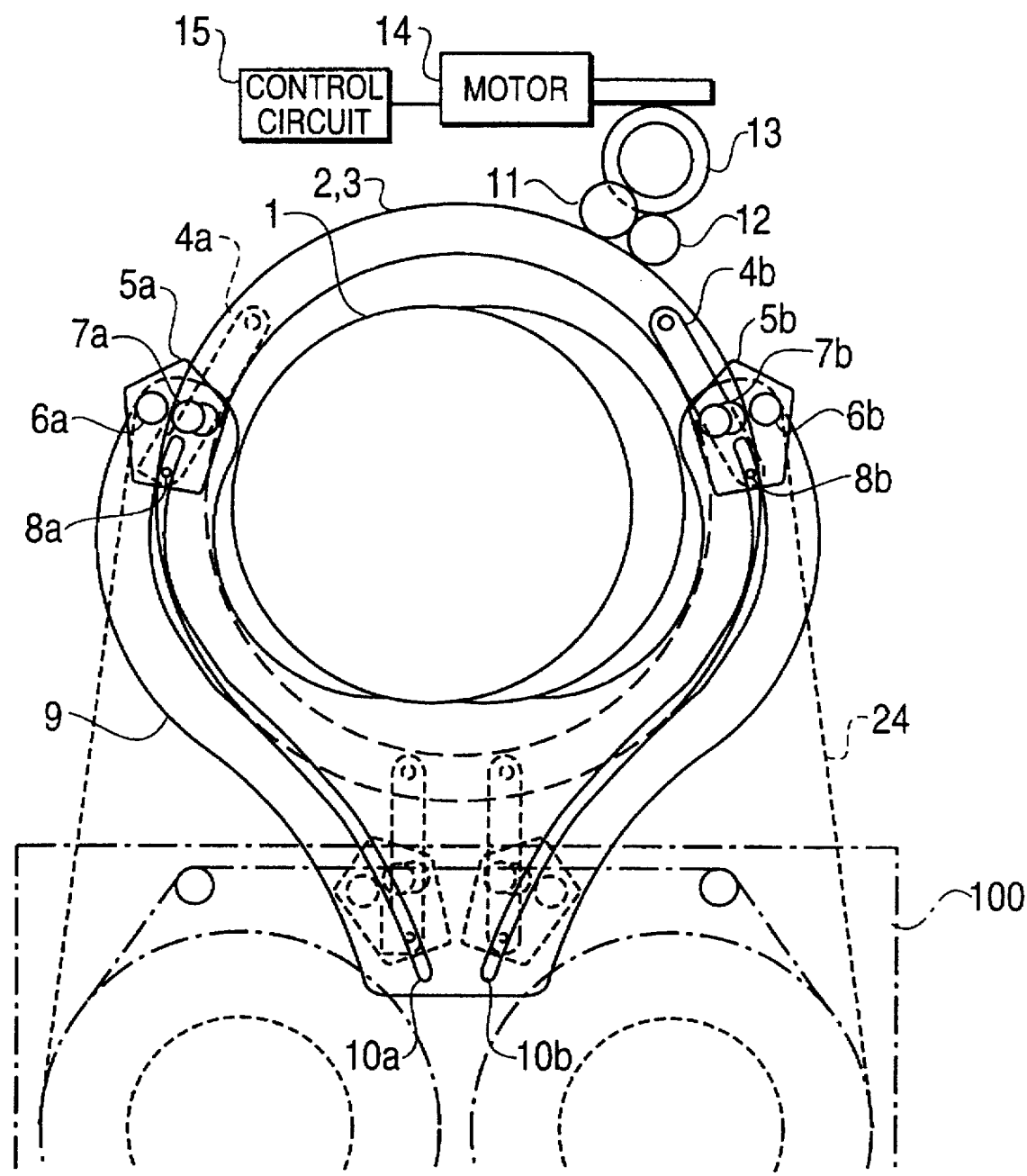
FIG. 1 is a plan view of a tape loading apparatus in an embodiment of the invention.

Referring now to the drawings, embodiments of first and second aspects of the invention are described below.

Figure 2:
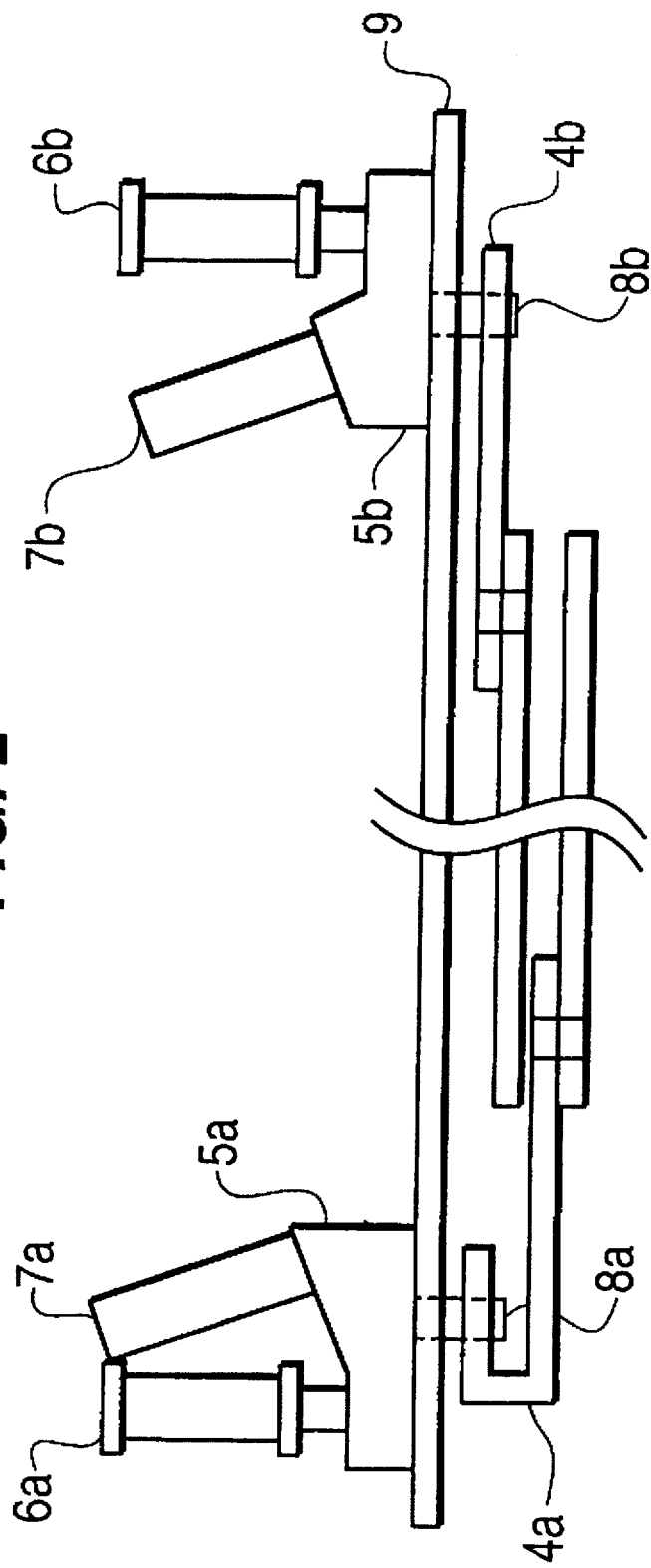
FIG. 2 is a side view showing parts of an embodiment of the invention.

In FIG. 1 and FIG. 2, rotary tape guides 6a, 6b are set up vertically on the top of tape drawing members 5a, 5b. Also on the top of the tape drawing members 5a, 5b, fixed tape guides 7a, 7b are set up at a specific inclination angle. On the bottom of the tape drawing members 5a, 5b, driving pins 8a, 8b are set up. The tape drawing members 5a, 5b are free to move reciprocally above a guide plate 9 fixed on a chassis (not shown). The driving pins 8a, 8b are engaged with grooves 10a, 10b formed in the guide plate 9. The driving pins 8a, 8b are free to move reciprocally along the grooves 10a, 10b. The grooves 10a, 10b are formed between the loading completion position (where the tape is wound on the cylinder 1 and ready to run for recording or reproduction) and unloading completion position (where the tape is stored in the tape cassette 100) of the tape drawing members 5a, 5b. The grooves 10a, 10b are formed almost symmetrically right and left to the cylinder 1. The grooves 10a, 10b are respectively engaged with the first tape drawing member 5a and second tape drawing member 5b. As the individual tape drawing members 5a, 5b move reciprocally, the tape is loaded and unloaded.

The driving pins 8a, 8b are respectively engaged with holes of links 4a, 4b disposed at the lower side of the guide plate 9. At the outer side of the cylinder 1 and at the lower side of the guide plate 9, a first ring gear 2 is disposed. To this ring gear 2, the link 4a is fitted so as to be free to rotate about its end. The link 4a has a hole to be fitted with the driving pin 8a in the end portion at the opposite side of the end portion engaged with the ring gear 2. The first ring gear 2 is held by a fixing member (not shown) so as to be free to rotate about the center of rotation of the gear. The second ring gear 3 is disposed between the first ring gear 2 and the guide plate 9, and coaxially with the first ring gear 2. The ring gear 3 is provided with the link 4b so as to be free to rotate about its end portion. The link 4b has a hole to be engaged with the driving pin 8b in the opposite end portion of the end portion engaged with the ring gear 3. The first ring gear 2 is engaged with a first idler gear 11. The second ring gear 3 is engaged with a second idler gear 12. The first idler gear 11 is engaged with the second idler gear 12. A wheel gear 13 is engaged with the first idler gear 11 and is driven by a motor 14. To control the driving voltage of the motor 14, a control circuit 15 is connected to the motor 14.

In this constitution, the operation of the invention in its first aspect is described below.

When the motor 14 is driven in loading, the control circuit 15 controls the driving voltage of the motor 14 so that the moving speed of the tape drawing members 5a, 5b may be a preset value. The rotation of the motor 14 is transmitted to the wheel gear 13. The wheel gear 13 drives the first idler gear 11. Consequently, the first idler gear 11 drives the first ring gear 2. By the link 4a fitted to the first ring gear 2, the first tape drawing member 5a is moved from the storing position to the drawing completion position. At the same time, the first idler gear 11 drives the second idler gear 12. The second idler gear 12 drives the second ring gear 3 by rotating in the opposite direction to the rotating direction of the first ring gear 2. By the link 4b fitted to the second ring gear 3, the second tape drawing member 5b moves from the storing position to the drawing completion position. That is, by the rotation of the motor 14 in loading, the first and second tape drawing members 5a, 5b are simultaneously moved from the storing position to the drawing completion position, at a predetermined moving speed to draw the tape 24 out of a tape cassette 100.

On the other hand, when unloading, by driving the motor 14 in the opposite direction of loading, the control circuit 15 controls the driving voltage of the motor 14 so that the moving speed of the tape drawing members 5a, 5b may be a predetermined value which is different from the loading speed. As a result, the motor 14 moves the first and second tape drawing members 5a, 5b from the drawing completion position to the storing completion position through the same driving system as in loading to store the tape 24 into the tape cassette 100. That is, by the rotation of the motor 14 in unloading, the first and second tape drawing members 5a, 5b move at a predetermined moving speed which is different from that of loading, simultaneously from the drawing completion position to the storing completion position.

Figure 3:
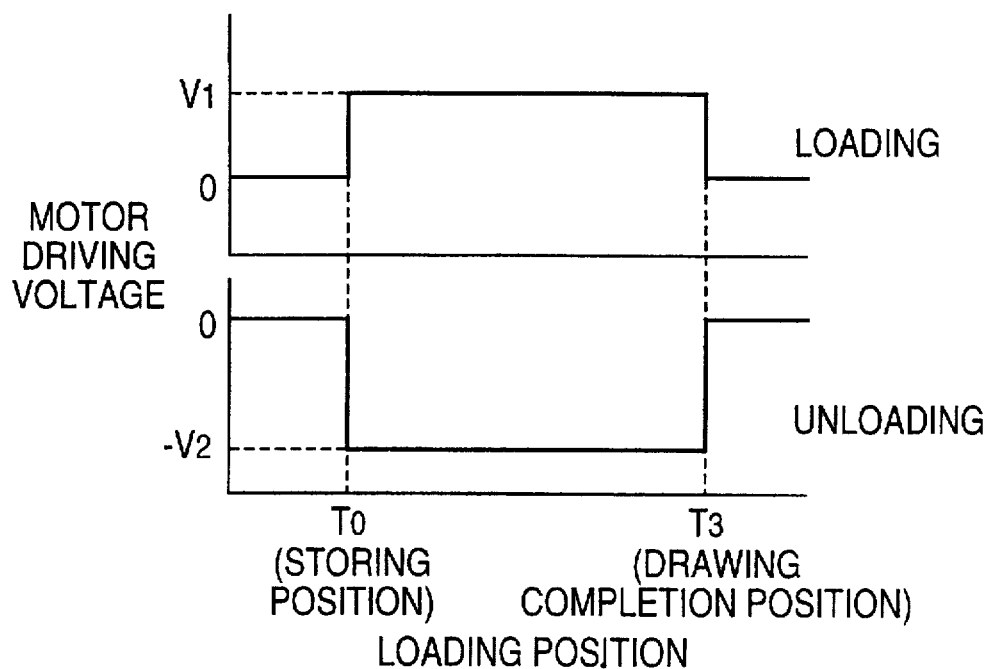
FIG. 3 is a conceptual drawing for explaining the operation of an embodiment of the invention.

Referring to FIG. 3, the motor driving voltage at this time is described below.

When loading, the motor 14 is driven at voltage $V_1$ from the storing completion position $T_0$ to the drawing completion position $T_3$.

When unloading, on the other hand, the motor 14 is driven at voltage $-V_2$ from the drawing completion position $T_3$ to the storing completion position $T_0$.

In this constitution, the operation in the second aspect of the invention is described below.

When loading, same as in the operation of the first aspect to the invention, the first and second tape drawing members 5a, 5b are driven by the rotation of the motor 14, simultaneously from the storing completion position to the drawing completion position. At this time, in the midst of loading, the moving speed of the first and second tape drawing members 5a, 5b is controlled by the control circuit 15 so as to change from the first moving speed to the second moving speed.

On the other hand, when unloading, same as in the operation of the first aspect of the invention, the first and second tape drawing members 5a, 5b are driven simultaneously by the rotation of the motor 14 from the drawing completion position to the storing completion position. At this time, in the midst of unloading, the moving speed of the first and second tape drawing members 5a, 5b is controlled by the control circuit 15 so as to change from the second moving speed to the first moving speed.

Figure 4:
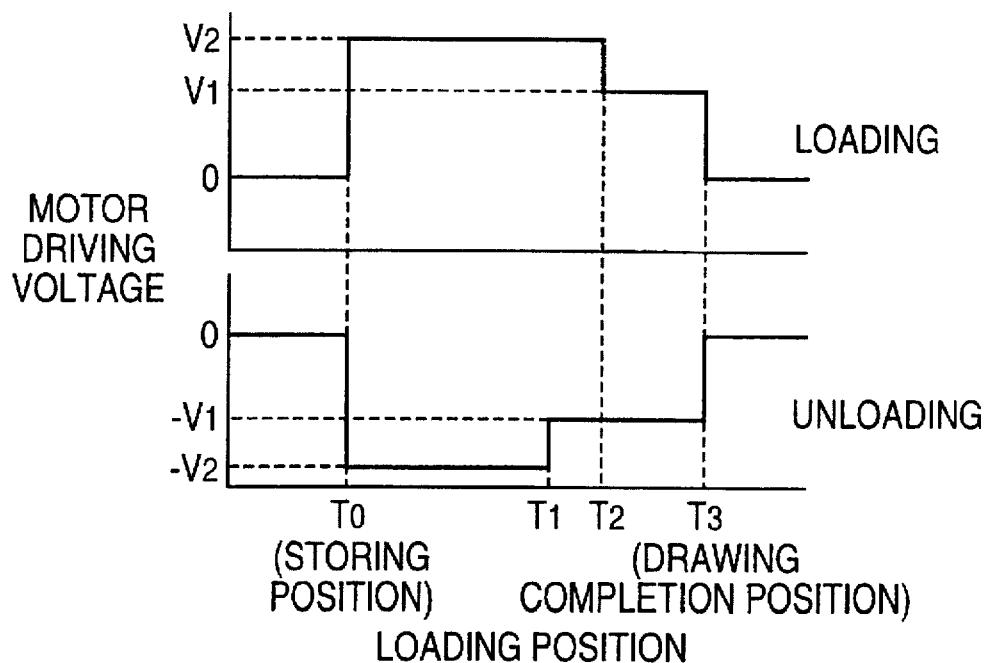
FIG. 4 is a conceptual drawing for explaining the operation of an embodiment of the invention.

In FIG. 4, the motor driving voltage at this time is described below.

When loading, the motor 14 is driven at a voltage $V_2$ from the storing position $T_0$ to the change point $T_2$, and the motor 14 is driven at voltage $V_1$ from the change point $T_2$ to the drawing completion position $T_3$.

When unloading, on the other hand, the motor 14 is driven at voltage $-V_1$ from the drawing completion position $T_3$ to the change point $T_1$, and the motor 14 is driven at voltage $-V_2$ from the change point $T_1$ to the storing position $T_0$.

In the embodiment, the moving speed of the drawing members 5a, 5b is set as first and second types, but the moving speed and the changing timing of the moving speed may be set as a higher number of types.

A third embodiment of the invention is described below while referring to the drawings.

Figure 5:
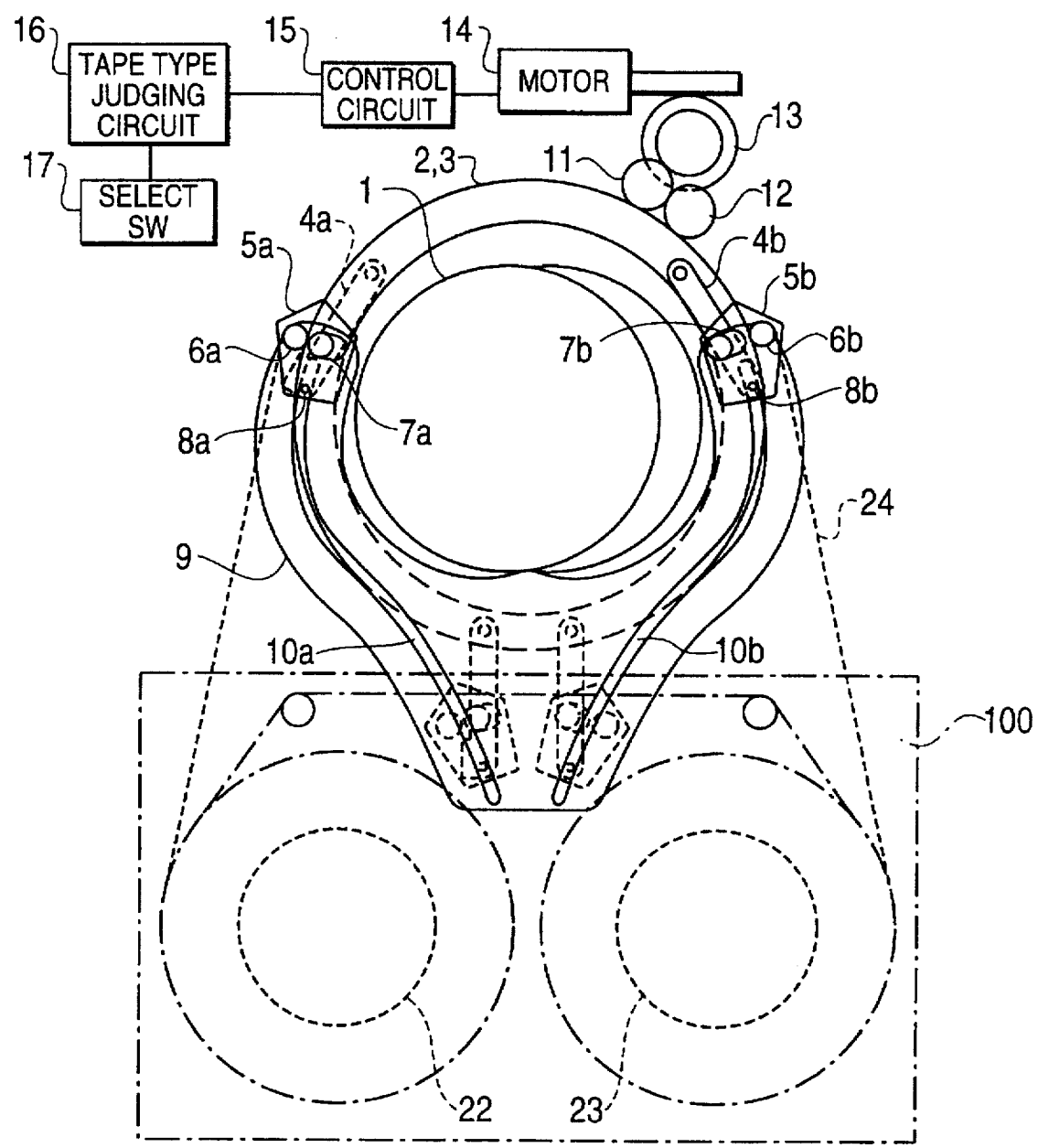
FIG. 5 is a plan view of a tape loading apparatus in another embodiment of the invention.

In FIG. 2 and FIG. 5, rotary tape guides 6a, 6b are set up vertically on the top of the tape drawing members 5a, 5b. On the top of the tape drawing members 5a, 5b, fixed tape guides 7a, 7b are planted at a specific inclination angle. On the bottom of the tape drawing members 5a, 5b, driving pins 8a, 8b are set up. The tape drawing members 5a, 5b can move reciprocally on the guide plate 9 fixed on the chassis (not shown). The driving pins 8a, 8b are engaged with grooves 10a, 10b formed on the guide plate 9. The driving pins 8a, 8b can move reciprocally along the grooves 10a, 10b. The grooves 10a, 10b are formed between the loading completion position and unloading completion position of the tape drawing members 5a, 5b. The grooves 10a, 10b are formed almost symmetrically right and left to the cylinder 1. In the grooves 10a, 10b, the first tape drawing member 5a and second tape drawing member 5b are engaged, respectively. As the tape drawing members 5a, 5b move reciprocally, the tape is loaded and unloaded.

The driving pins 8a, 8b are engaged with holes of the links 4a, 4b disposed at the lower side of the guide plate 9, respectively. At the outer side of the cylinder 1 and at the lower side of the guide plate 9, the first ring gear 2 is disposed. This ring gear 2 is combined with the link 4a so as to be free to rotate about its end portion. The link 4a has also a hole to be engaged with the driving pin 8a at the end of the opposite side of the end engaged with the ring gear 2. The first ring gear 2 is held by a fixing member (not shown) so as to be free to rotate about the center of gear rotation. The second ring gear 3 is disposed between the first ring gear 2 and guide plate 9, and coaxially with the first ring gear 2. This ring gear 3 is fitted with the link 4b so as to be free to rotate about its end portion. The rink 4b also has a hole to be engaged with the driving pin 8b at the end of the opposite side of the end engaged with the ring gear 3. The first ring gear 2 is engaged with the first idler gear 11. The second ring gear 3 is engaged with the second idler gear 12. The first idler gear 11 is engaged with the second idler gear 12. Moreover, the wheel gear 13 is engaged with the first idler gear 11, and is driven by the motor 14. To control the driving voltage of the motor 14, a control circuit 15 is connected to the motor 14.

On the operation panel of the VTR, a selector switch 17 is provided for selecting the type of the tape 24 to be used. Depending on the output result of this selector switch 17, a judging circuit 16 for judging the type of the tape 24 is connected to the selector switch 17. This judging circuit 16 is connected to the control circuit 15.

In this constitution, the operation of the invention according to the third embodiment is described below. When the user sets the selector switch 17 in the standard tape 24, the tape type judging circuit 16 senses the standard thickness tape 24. Afterwards, the speed control circuit 15 drives the motor 14 at a driving voltage preset depending on the standard thickness tape 24.

When loading, the rotation of the motor 14 is transmitted to the wheel gear 13. The wheel gear 13 drives the first idler gear 11. As a result, the first idler gear 11 drives the first ring gear 2. By the link 4a fitted to the first ring gear 2, the first tape drawing member 5a moves from the storing position to the drawing completion position. At the same time, the first idler gear 11 drives the second idler gear 12. Consequently, the second idler gear 12 rotates and drives the second ring gear 3 in the opposite direction of the first ring gear 2. As a result, by the link 4b fitted to the second ring gear 3, the second tape drawing member 5b moves from the storing position to the drawing completion position. That is, by the rotation of the motor 14 in loading, the first and second tape drawing members 5a, 5b move simultaneously from the storing position to the drawing completion position at a predetermined moving speed to draw the tape 24 out of the tape cassette 100. The driving voltage of the motor 14 at this time is controlled to the value predetermined depending on the type of the tape.

When unloading, the motor 14 is driven in the reverse direction of loading. The motor 14 moves the first and second tape drawing members 5a, 5b from the drawing completion position to the storing completion position, through the same driving system as in loading. That is, by the rotation of the motor 14 when unloading, the first and second tape drawing members 5a, 5b move simultaneously from the drawing completion position to the storing completion position at a predetermined moving speed to store the tape 24 into the tape cassette 100. The driving voltage of the motor 14 at this time is controlled to a predetermined value depending on the type of the tape.

On the other hand, when the user sets the selector switch 17 in the thin tape 24, and the tape type judging circuit 16 senses the thin thickness tape 24. Afterwards, the speed control circuit 15 drives the motor 14 at a driving voltage predetermined depending on the thin tape 24.

When the motor rotates 14 in loading and unloading, through the same driving system as in the case of the standard thickness tape 24, the tape drawing members 5a, 5b are moved at moving speed different from that in standard thickness tape 24.

Referring now to FIG. 6, the motor driving voltage at this time is described.

As shown in FIG. 6(a), when loading the standard thickness tape 24, the motor 14 is driven at voltage $V_1$ from the storing position $T_0$ to the drawing completion position $T_3$. When unloading, the motor 14 is driven at voltage $-V_1$ from the drawing completion position $T_3$ to the storing position $T_0$.

On the other hand, as shown in FIG. 6(b), when loading the thin tape 24, the motor 14 is driven at voltage $V_2$ from the storing position $T_0$ to the drawing completion position $T_0$. When unloading, the motor 14 is driven at voltage $-V_2$ from the drawing completion position $T_0$ to the storing position $T_0$.

A fourth aspect of the invention is described below while referring to the drawing.

In the following description, a discussion of those parts which are the same as in the third aspect of the invention is omitted.

Figure 7:
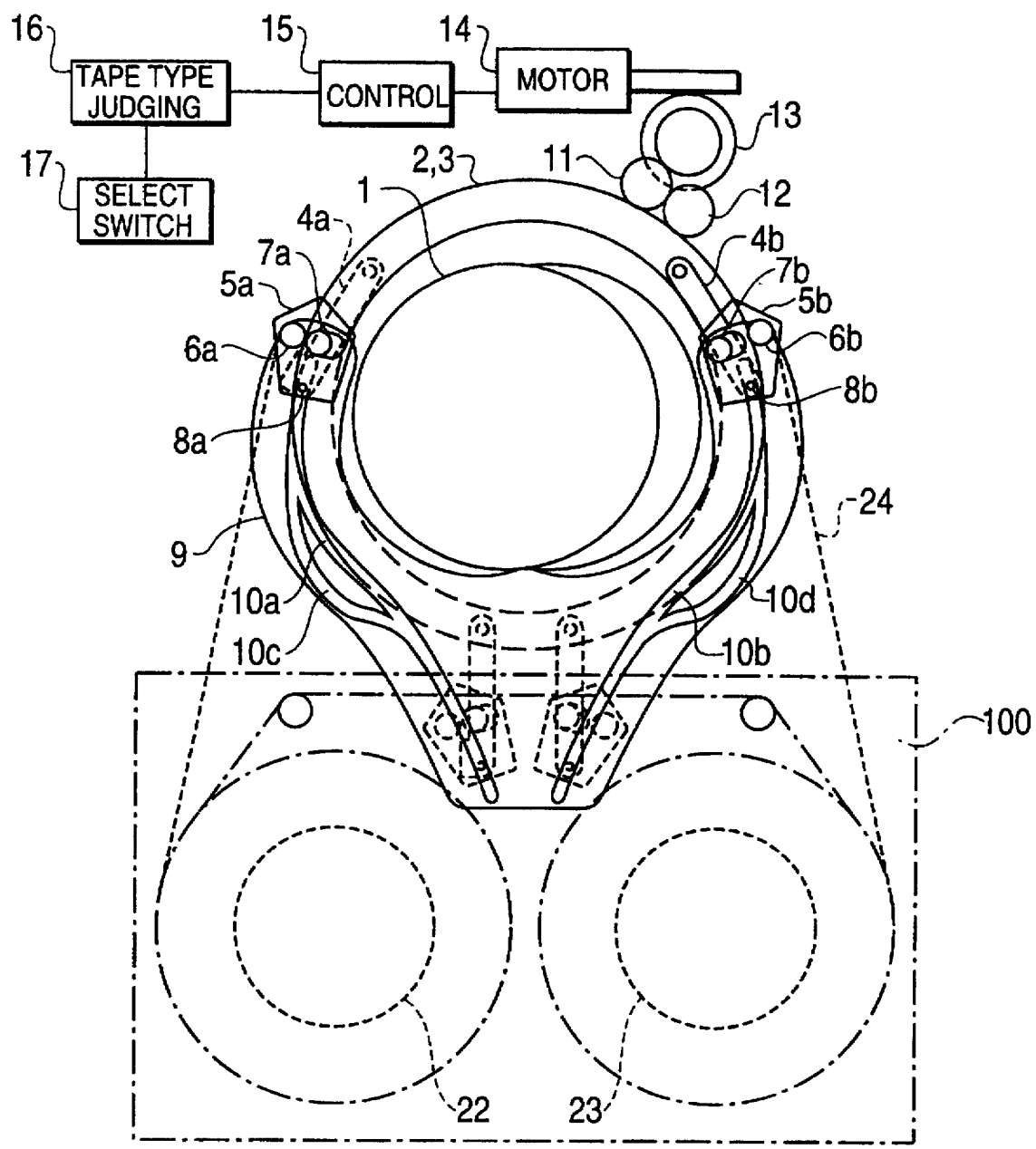
FIG. 7 is a plan view of a tape loading apparatus in still another embodiment of the invention.

In FIG. 7, the guide plate 9 is provided with first groove 10a and third groove 10c for controlling the posture of the first tape drawing member 5a. The guide plate 9 also comprises second groove 10b and fourth groove 10d for controlling the posture of the second tape drawing member 5b. The first groove 10a and second groove 10b are used in loading and unloading of a standard tape. The third groove 10c and fourth groove 10d are used in loading and unloading of a thin tape thinner than the standard tape.

The operation of the invention in the fourth aspect thus constituted is described below.

When the user sets the selector switch 17 to the standard thickness tape 24, the tape type judging circuit 16 senses the standard thickness tape 24. Afterwards, when loading and unloading, the grooves for controlling the posture of the first and second tape drawing members 5a, 5b are selected as the first groove 10a and second groove 10b by the groove changeover mechanism (not shown).

When loading, the motor 14 drives the first and second tape drawing members 5a, 5b through the same driving system as in the third aspect of the invention. The first and second tape drawing members 5a, 5b are respectively guided by the first groove 10a and second groove 10b, and draw out the tape 24 from the tape cassette 100. When unloading, the first and second tape drawing members 5a, 5b are guided by the first groove 10a and second groove 10b, and the tape 24 is stored into the tape cassette 100. At this time, the first groove 10a and second groove 10b are set so that the tape damage may be small when loading and unloading.

On the other hand, when the user sets the selector switch 17 to the thin tape 24, the tape type judging circuit 16 senses the thin tape 24. Thereafter, in loading and unloading, when controlling the posture of the first and second tape drawing members 5a, 5b, the third groove 10c and fourth groove 10d are selected by the groove changeover mechanism (not shown).

When the motor 14 is driven at the time of loading, through the same driving system as in the third aspect of the invention mentioned above, the first and second tape drawing members 5a, 5b are guided by the third groove 10c and fourth groove 10d, and the tape 24 is drawn out from the tape cassette 100. When unloading, the first and second tape drawing members 5a, 5b are guided by the third groove 10c and fourth groove 10d, and the tape 24 is stored into the tape cassette 100. At this time, the third groove 10c and fourth groove 10d are set so that the tape damage may be minimized.

A fifth aspect of the invention is described below while referring to the drawings.

In the description there follows, a discussion of parts which are the same as those in the third embodiment is omitted.

Figure 8:
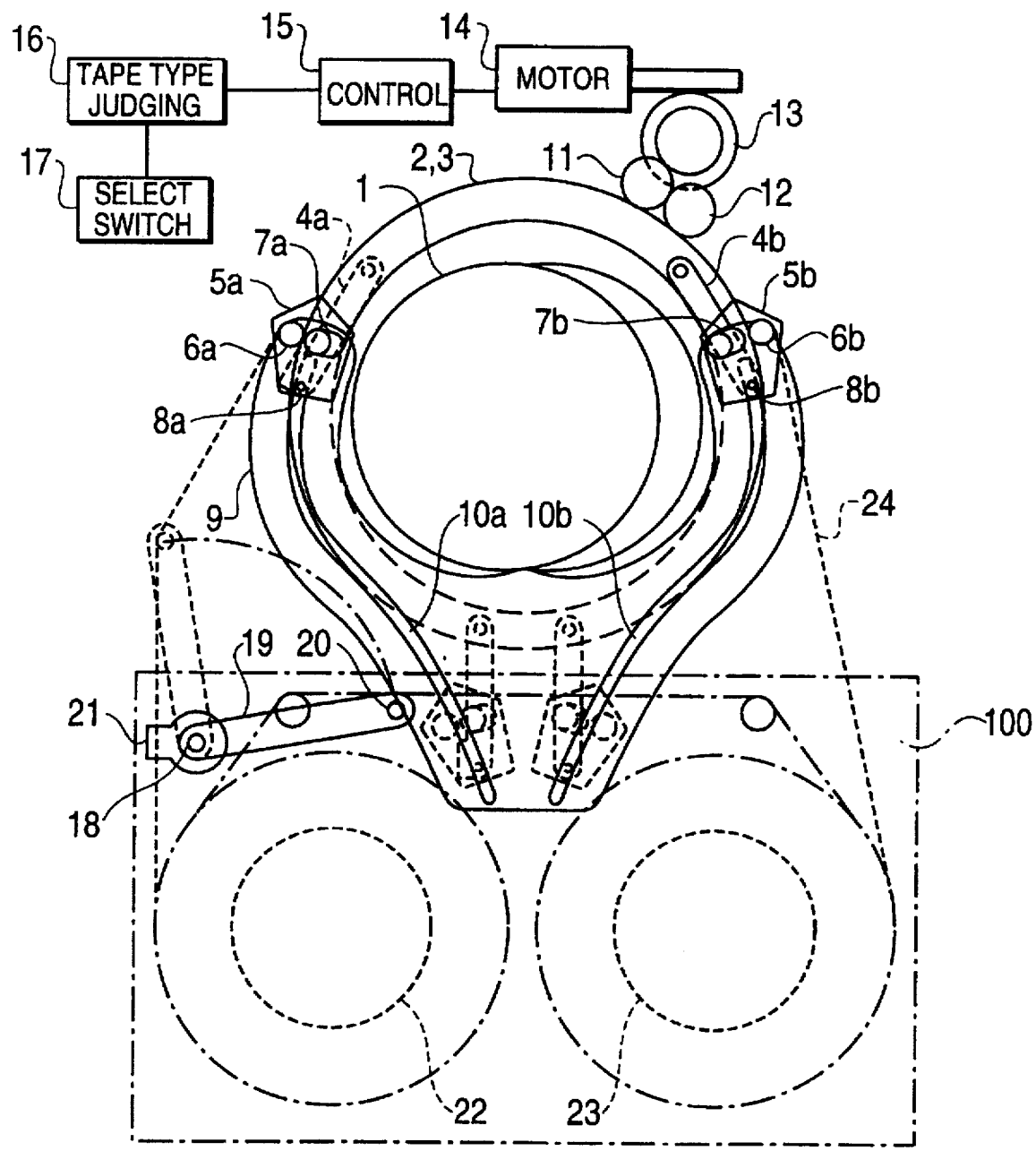
FIG. 8 is a plan view of a tape loading apparatus in a further embodiment of the invention.

In FIG. 8, an arm member 19 is rotatably fitted on a shaft 18 set up on a chassis (not shown). At the other end of the arm member 19, a tape guide 20 is set up. The arm member 19 is provided with a tension sensor 21 for detecting the tape tension. Reel motors 22, 23 drive the take-up reel and feed reel, and control the tape tension when loading and unloading.

In the thus constituted fifth aspect, the operation of the invention is described below.

When the user sets the selector switch 17 to the standard tape 24, the tape type judging circuit 16 senses the standard thickness tape 24. Thereafter, the reel motors 22, 23 drive the take-up and feed reel so that the tape tension may be a predetermined first value $S_2$ when loading and unloading.

Accordingly, when loading, the first and second tape drawing members 5a, 5b are driven through the same driving system as in the third aspect of the invention. The first and second tape drawing members 5a, 5b are guided by the first groove 10a and second groove 10b, and draw out the tape 24 from the tape cassette 100. At the same time, the tape guide 20 set up on the arm member 19 senses the tape tension while drawing out the tape 24. In order that the tape tension may be the first value $S_2$, the reel motors 22, 23 control the take-up and feed reels. When unloading, the first and second tape drawing members 5a, 5b are driven through the same driving system as in the first aspect of the invention. The first and second tape drawing members 5a, 5b are guided by the first groove 10a and second groove 10b, respectively, and the tape 24 is stored into the tape cassette 100. At the same time, the tape guide 20 set up on the arm member 19 senses the tape tension while storing the tape. In order that the tape tension may be the first value $S_1$, the reel motors 22, 23 control the take-up and feed reels. At this time, the first tape tension value $S_2$ is set so that the tape damage may be reduced.

On the other hand, when the user sets the selector switch 17 to the thin tape 24, the tape type judging circuit 16 senses the thin tape 24. Thereafter, the reel motors 22, 23 drive the take-up and feed reels so that the tape tension may be a preset second value $S_2$ which is different from that of the standard tape 24, when loading and unloading.

When loading, the first and second tape drawing members 5a, 5b are driven through the same driving system as in the third aspect of the invention. The first and second tape drawing members 5a, 5b are guided by the first groove 10a and second groove 10b, respectively, and the tape 24 is drawn out from the tape cassette 100. At the same time, the tape guide 20 set up on the arm member 19 senses the tape tension while drawing out the tape 24. In order that the tape tension may be the second value $S_2$, the reel motors 22, 23 control the take-up and feed reels. When unloading, the first and second tape drawing members 5a, 5b are driven through the same driving system as in the third aspect of the invention. The first and second tape drawing members 5a, 5b are guided by the first groove 10a and second groove 10b, and the tape 24 is stored into the tape cassette 100. At the same time, the tape guide 20 set up on the arm member 19 senses the tape tension while storing the tape 24. In order that the tape tension may be the second value $S_2$, the reel motors 22, 23 control the take-up and feed reels. At this time, the second tape tension value $S_2$ is set so that tape damage may be reduced.

The tape tension at this time is described while referring to FIG. 9.

Figure 9A:
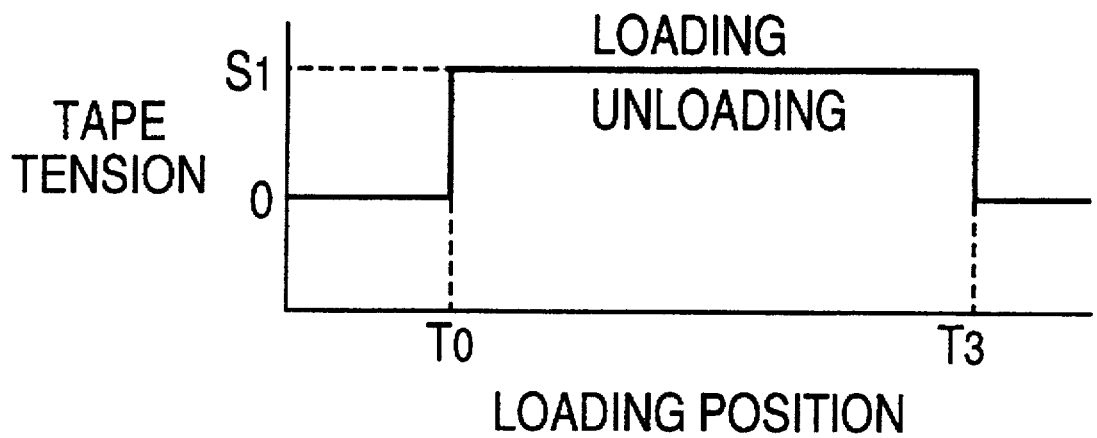
FIGS. 9(a) and 9(b) are conceptual drawings for explaining the operation of an embodiment of the invention.
Figure 9B:
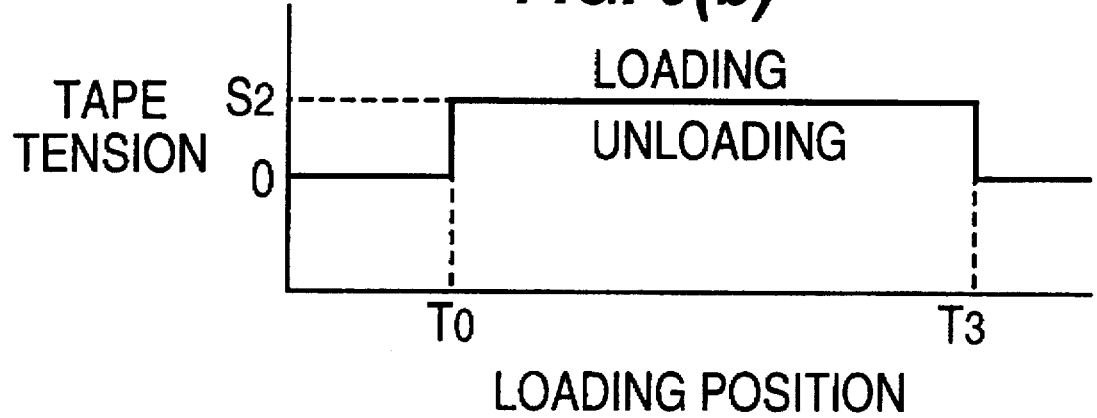

When using the tape of standard thickness, as shown in FIG. 9(a), at the time of loading, the tape tension is controlled at the first value $S_1$ from the tape storing position $T_0$ to the tape drawing completion position $T_3$. At the time of unloading, the tape tension is controlled to be the first value $S_1$ from the tape drawing completion position $T_3$ to the tape storing position $T_0$. On the other hand, when using a thin tape, as shown in FIG. 9(b), at the time of loading, the tape tension is controlled to be the second value $S_2$ from the tape storing position $T_0$ to the tape drawing completion position $T_3$. At the time of unloading, the tape tension is controlled to be the second value $S_2$ from the tape drawing completion position $T_3$ to the tape storing position $T_0$.

What is claimed is:

1. A tape loading apparatus operable in a loading mode for loading a tape from a tape cassette to a predetermined position and in an unloading mode for unloading the tape into the tape cassette, comprising:

a cylinder having a head mounted thereon;

a tape guide for drawing out the tape from the tape cassette and winding the tape on the cylinder;

a tape drawing member for supporting the tape guide and movable reciprocally between a first position where the tape is unloaded in the tape cassette and a second position where the tape is loaded in the predetermined position;

driving means for driving the tape drawing member to move from the first position to the second position in the loading mode and from the second position to the first position in the unloading mode; and control means for controlling the driving means such that the driving means changes a moving speed of the tape drawing member in the loading mode in a different manner than in the unloading mode, wherein the control means through control of the driving means changes the moving speed of the tape drawing member at a predetermined first intermediate position between the first position and the second position in the loading mode and at a predetermined second intermediate position between the first position and the second position in the unloading mode, where the second intermediate position is different from the first intermediate position.

2. A tape loading apparatus as claimed in claim 1, wherein said control means applies a drive signal to said driving means, the drive signal having an absolute value which controls the moving speed of the tape drawing member, and wherein the absolute value of the drive signal changes from a first absolute value to a different second absolute value at the predetermined first intermediate position during the loading mode and at the predetermined second intermediate position during the unloading mode.

* * * * *